United States Patent
Ma et al.

(10) Patent No.: US 12,439,425 B2
(45) Date of Patent: Oct. 7, 2025

(54) SYSTEMS AND METHODS FOR SLOT OFFSET INFORMATION MANAGEMENT

(71) Applicant: ZTE Corporation, Shenzhen (CN)

(72) Inventors: Xiaoying Ma, Shenzhen (CN); Mengzhu Chen, Shenzhen (CN); Jun Xu, Shenzhen (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/625,991

(22) Filed: Apr. 3, 2024

(65) Prior Publication Data
US 2024/0251421 A1 Jul. 25, 2024

Related U.S. Application Data

(63) Continuation of application No. 17/459,119, filed on Aug. 27, 2021, now Pat. No. 11,963,187, which is a continuation of application No. PCT/CN2019/080996, filed on Apr. 2, 2019.

(51) Int. Cl.
*H04W 72/23* (2023.01)
*H04L 5/00* (2006.01)
*H04W 72/0446* (2023.01)

(52) U.S. Cl.
CPC .......... *H04W 72/23* (2023.01); *H04L 5/0048* (2013.01); *H04L 5/0053* (2013.01); *H04W 72/0446* (2013.01)

(58) Field of Classification Search
CPC .............. H04W 72/23; H04W 72/0446; H04L 5/0048; H04L 5/0053
See application file for complete search history.

(56) References Cited

U.S. PATENT DOCUMENTS

| | | |
|---|---|---|
| 11,382,118 B2 | 7/2022 | Ang et al. |
| 11,963,187 B2 * | 4/2024 | Ma .......... H04L 5/0048 |
| 2020/0204293 A1 | 6/2020 | Kim et al. |

(Continued)

FOREIGN PATENT DOCUMENTS

| | | |
|---|---|---|
| CN | 108811122 A | 11/2018 |
| CN | 108633016 A | 10/2019 |

(Continued)

OTHER PUBLICATIONS

International Search Report and Written Opinion of the International Searching Authority for International Patent Application No. PCT/CN2019/080996 dated Jan. 2, 2020; 7 pages.

(Continued)

*Primary Examiner* — Justin Y Lee
(74) *Attorney, Agent, or Firm* — Crowell & Moring LLC

(57) ABSTRACT

This disclosure relates generally to wireless communications and, more particularly, to systems and methods for communication of slot offset information prior to communicating downlink control information. In one embodiment, a method performed by a communication node includes: determining slot offset indication information that classifies a slot offset information set as either a first kind or a second kind based on at least one of: high-layer configuration signaling and predefined information, and sending the slot offset indication information to a communication device.

20 Claims, 5 Drawing Sheets

(56) References Cited

U.S. PATENT DOCUMENTS

| | | | |
|---|---|---|---|
| 2020/0313831 A1 | 10/2020 | Kim et al. | |
| 2020/0314811 A1* | 10/2020 | Lin | H04W 52/0216 |
| 2021/0321446 A1 | 10/2021 | Lee et al. | |
| 2022/0022137 A1 | 1/2022 | Xue et al. | |
| 2022/0150883 A1* | 5/2022 | Yang | H04W 72/51 |

FOREIGN PATENT DOCUMENTS

| | | |
|---|---|---|
| KR | 20190017675 A | 2/2019 |
| KR | 20190029483 A | 3/2019 |
| WO | WO 2018/143784 A1 | 8/2018 |
| WO | WO 2018/219203 A1 | 12/2018 |
| WO | WO 2019/029823 A1 | 2/2019 |

OTHER PUBLICATIONS

Extended European Search Report for European Patent Application No. 19923411.3 dated Jul. 1, 2022, 11 pages.

ZTE: "Discussion on potential techniques for UE power saving", 3GPP Draft; RI-1902031 Discussion on Potential Techniques For UE Power Saving-Final, 3rd Generation Partnership Project (3GPP), Mobile Competence Centre; 650, Route Des Lucioles; F-06921 Sophia-Anti, vol. RAN WGI, no. Athens, Greece; Feb. 25, 2019-Mar. 1, 2019, Feb. 16, 2019 (Feb. 16, 2019), XP051599727, Retrieved from the Internet: URL://www.3gpp.org/ftp/tsg%5Fran/WG1%5FRL1/TSGR1%5F96/Docs/RI%2DI902031%2Ezip [retrieved on Feb. 16, 2019].

ZTE: "on adaptation aspects for NR UE power consumption reduction", 3GPP Draft; RI-1900226 on Adaptation Aspects For NR UE Power Consumption Reduction-Final, 3rd Generation Partnership Project (3GPP), Mobile Competence Centre; 650, Route Des Lucioles; F-06921 Sophia, vol. RAN WGI, no. Taipei; Jan. 21, 2019-Jan. 25, 2019 Jan. 20, 2019 (Jan. 20, 2019), XP051593148, Retrieved from the Internet: URL:http://www.3gpp.org/ftp/Meetings%5F3GPP%5FSYNC/RAN1/Docs/RI%2DI900226%2Ezip [retrieved on Jan. 20, 2019].

ASUSTEK: "Cross-slot scheduling for UE power saving", 3GPP Draft; RI-1904903 Cross-Slot Scheduling For UE Power Saving, 3rd Generation Partnership Project (3GPP), Mobile Competence Centre; 650, Route Des Lucioles; F-06921 Sophia-Antipolis Cedex; Franc vol. RAN WGI, no. Xi'an, China; Apr. 8, 2019-Apr. 12, 2019, Mar. 29, 2019 (Mar. 29, 2019), XP051691851, Retrieved from the Internet: URL:http://www.3gpp.org/ftp/tsg%5Fran/WG1%5FRL1/TSGR1%5F96b/Docs/RI%2DI90493%2Ezip [retrieved on Mar. 29, 2019].

Samsung: "UE adaptation schemes", 3GPP Draft; RI-1813011 UE Adaptation Schemes, 3rd Generation Partnership Project (3GPP), Mobile Competence Centre; 650, Route Des Lucioles; F-06921 Sophia-Antipolis Cedex; France, vol. RAN WGI, no. Spokane, USA; Nov. 12, 2018-Nov. 16, 2018, Nov. 11, 2018 (Nov. 11, 2018), XP051554989, Retrieved from the Internet: URL:http://www.3gpp.org/ftp/Meetings%5F3GPP%5FSYNC/RAN1/Docs/RI%2DI813011%2Ezip [retrieved on Nov. 11, 2018].

CATT: "On PDSCH and PUSCH resource 1-15 allocation", 3GPP Draft; RI-1800257, 3rd Generation Partnership Project (3GPP), Mobile Competence Centre; 650, Route Des Lucioles; F-06921 Sophia-Antipolis Cedex; France, vol. RAN WGI, no. Vancouver, Canada; Jan. 22, 2018-Jan. 26, 2018, Jan. 13, 2018 (Jan. 13, 2018), pp. 1-22, XP051384735, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018].

Indonesian Office Action with English Translation for Indonesian Patent Application No. P00202105364 dated Jun. 20, 2023, 6 pages.

Australian Office Action for Australian Patent Application No. 2019440085 dated Aug. 15, 2023, 3 pages.

Written Decision on Registration with English Translation for Korean Patent Application No. 10-2021-7021837 dated Jan. 8, 2024, 5 pages.

Extended European Search Report issued in European Patent Application No. 241926542 dated Dec. 11, 2024 (11 pages).

Qualcomm Incorporated: "Remaining Issues on DL/UL Resource Allocation" 3GPP TSG-RAN WG1 Meeting #93; R1-1807652; May 25, 2018, 16 pages.

Qualcomm Incorporated: "Summary for UE Power Saving Evaluation" 3GPP TSG-RAN WG1 #96; R1-1903806, Mar. 1, 2019, 37 pages.

3rd Generation Partnership Project; Technical Specification Group Radio Access Network; NR; Study on UE Power Saving (Release 16), 3GPP TR 38.840 V1.0.0, Mar. 2019, 73 pages.

ASUSTek: "Cross-slot scheduling for UE power saving" 3GPP TSG RAN WG1 #96bis; R1-1904903; Apr. 12, 2019, 3 pages.

* cited by examiner

SYSTEMS AND METHODS FOR SLOT OFFSET INFORMATION MANAGEMENT

CROSS-REFERENCE TO RELATED APPLICATION D

This application is a continuation of U.S. patent application Ser. No. 17/459,119 filed on Aug. 27, 2021, which is a continuation application of PCT International Patent Application No. PCT/CN2019/080996, filed with the China National Intellectual Property Administration, PRC on Apr. 2, 2019, each of which is incorporated herein by reference in their entireties.

TECHNICAL FIELD

This disclosure relates generally to wireless communications and, more particularly, to systems and methods for communication of slot offset information prior to communicating downlink control information.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today. With the development of wireless communication technologies, the transmission rate, delay, throughput, reliability and other performance indexes of wireless communication system have been greatly improved by using high frequency band, large bandwidth, multi-antenna and other technologies. On the other hand, in order to achieve high-performance wireless transmissions, devices may need to carry out more complex processing with ever greater power consumption requirements to meet performance requirements, such as monitoring for a larger control channel bandwidth, encoding and decoding processing for more complex control information and data information, and the like.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication node includes: determining slot offset indication information that classifies a slot offset information set as either a first kind or a second kind based on at least one of: high-layer configuration signaling and predefined information, wherein the slot offset information set characterizes an offset between one of: a downlink control information time slot and a physical downlink shared channel time slot (K0), the downlink control information time slot and a physical uplink shared channel time slot (K2), a triggering downlink control information time slot and an aperiodic non zero power channel state information reference signal (NZP CSI-RS) resources set time slot (aperiodic CSI-RS offset), and the physical downlink shared channel time slot and a hybrid automatic repeat request acknowledgement time slot (K1), wherein: the slot offset information set is the first kind when the offset is greater than or equal to 0 and less than or equal to Nmax, wherein the Nmax is a positive integer greater than 10, and the slot offset information set is the second kind when the offset is greater than or equal to a minimum threshold value and less than or equal to the Nmax, wherein the minimum threshold value is an integer greater than zero; and sending the slot offset indication information to a communication device.

In a further embodiment, a method performed by a communication device includes: receiving slot offset indication information from a communication node, wherein the slot offset indication information classifies a slot offset information set as either a first kind or a second kind based on at least one of: high-layer configuration signaling and predefined information, wherein the slot offset information set characterizes an offset between one of: a downlink control information time slot and a physical downlink shared channel time slot (K0), the downlink control information time slot and a physical uplink shared channel time slot (K2), a triggering downlink control information time slot and an aperiodic non zero power channel state information reference signal (NZP CSI-RS) resources set time slot (aperiodic CSI-RS offset), and the physical downlink shared channel time slot and a hybrid automatic repeat request acknowledgement time slot (K1), wherein: the slot offset information set is the first kind when the offset is greater than or equal to 0 and less than or equal to Nmax, wherein the Nmax is a positive integer greater than 10, and the slot offset information set is the second kind when the offset is greater than or equal to a minimum threshold value and less than or equal to the Nmax, wherein the minimum threshold value is an integer greater than zero.

In a further embodiment, a communication node includes: at least one processor configured to: determine slot offset indication information that classifies a slot offset information set as either a first kind or a second kind based on at least one of: high-layer configuration signaling and predefined information, wherein the slot offset information set characterizes an offset between one of: a downlink control information time slot and a physical downlink shared channel time slot (K0), the downlink control information time slot and a physical uplink shared channel time slot (K2), a triggering downlink control information time slot and an aperiodic non zero power channel state information reference signal (NZP CSI-RS) resources set time slot (aperiodic CSI-RS offset), and the physical downlink shared channel time slot and a hybrid automatic repeat request acknowledgement time slot (K1), wherein: the slot offset information set is the first kind when the offset is greater than or equal to 0 and less than or equal to Nmax, wherein the Nmax is a positive integer greater than 10, and the slot offset information set is the second kind when the offset is greater than or equal to a minimum threshold value and less than or equal to the Nmax, wherein the minimum threshold value is an integer greater than zero; and a transmitter configured to send the slot offset indication information to a communication device.

In a further embodiment, a communication device includes: a receiver configured to receive slot offset indication information from a communication node, wherein the slot offset indication information classifies a slot offset information set as either a first kind or a second kind based on at least one of: high-layer configuration signaling and predefined information, wherein the slot offset information set characterizes an offset between one of: a downlink control information time slot and a physical downlink shared channel time slot (K0), the downlink control information time slot and a physical uplink shared channel time slot (K2), a triggering downlink control information time slot and an aperiodic non zero power channel state information reference signal (NZP CSI-RS) resources set time slot (aperiodic CSI-RS offset), and the physical downlink shared channel time slot and a hybrid automatic repeat request acknowledgement time slot (K1), and wherein: the slot offset information set is the first kind when the offset is greater than or equal to 0 and less than or equal to Nmax, wherein the Nmax is a positive integer greater than 10, and the slot offset information set is the second kind when the offset is greater than or equal to a minimum threshold value and less than or equal to the Nmax, wherein the minimum threshold value is an integer greater than zero.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
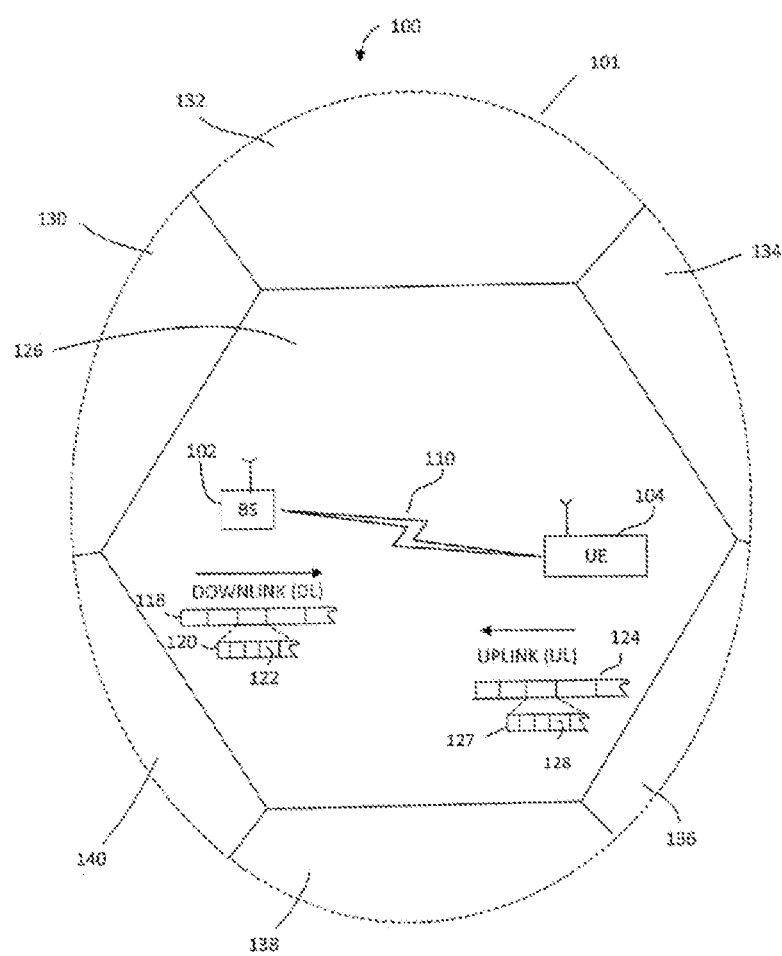
FIG. 1 illustrates an exemplary wireless communication network in which techniques disclosed herein may be implemented, in accordance with some embodiments.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and multiple user equipment devices 104 (hereinafter "UEs 104") that can communicate with each other via respective communication links 110 (e.g., a wireless communication channel), and a cluster of notional cells 126, 130, 132, 134, 136, 138 and 140 overlaying a geographical area with a network 101. Each UE 104 may undergo a random access procedure to join the network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a short hand reference to a BS with an associated coverage region or area (e.g., cell). In certain embodiments, a cell may be interchangeably referred to as a BS or a node.

For example, the BS 102 may operate at an allocated channel transmission bandwidth (e.g., spectrum) to provide adequate coverage to each UE 104. The spectrum may be regulated to define a licensed range and/or an unlicensed range. The BS 102 and each UE 104 may communicate via a downlink slot 118, and an uplink slot 124 respectively. The slots may also be referred to as a time slot. Each slot 118/124 may be further divided into mini-slots 120/127 which may include data symbols 122/128. In the present disclosure, the BS 102 and each UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE in relationship to a BS and a communication node may refer more specifically to a BS in relation to the UE.

Figure 2:
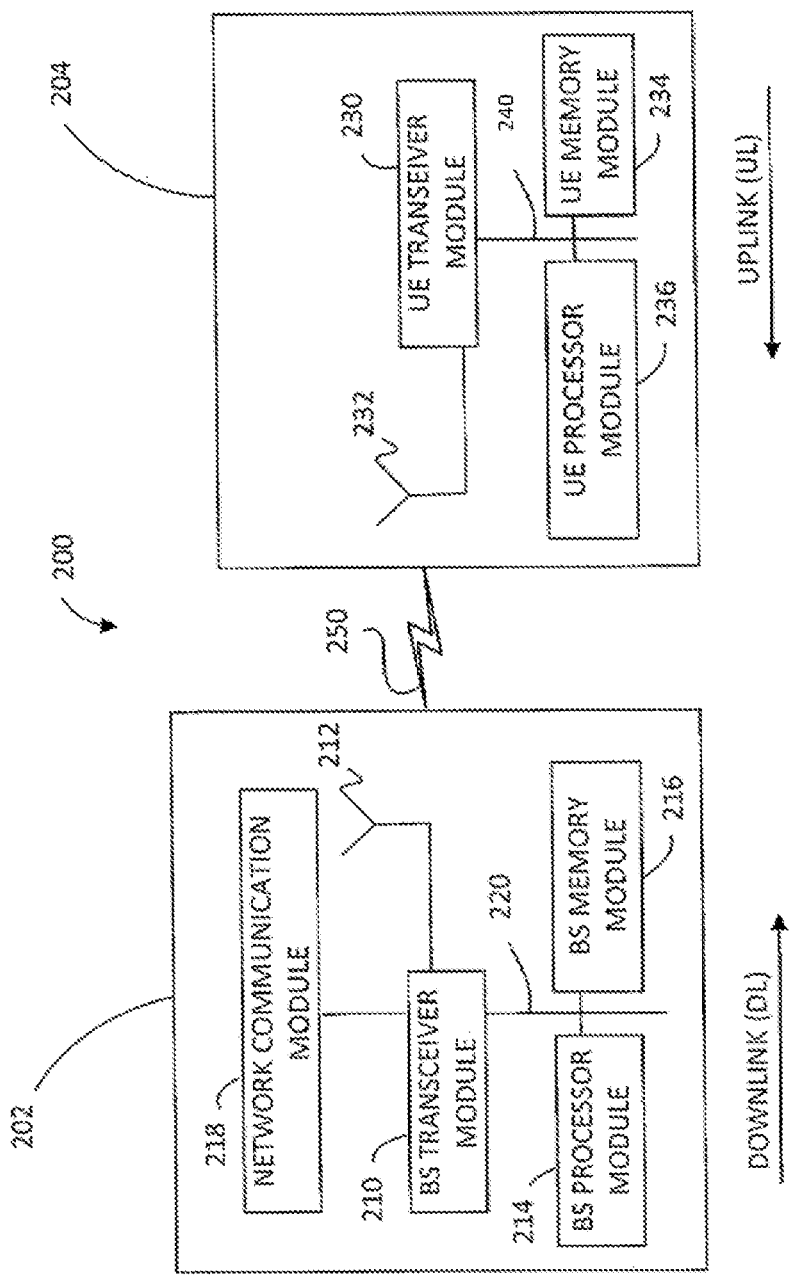
FIG. 2 illustrates a block diagram of an exemplary wireless communication system for transmitting and receiving wireless communication signals in accordance with some embodiments.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (CNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

In the development of wireless communication technology, it may be desirable to achieve a balance between system performance and power. Typically, downlink control information (DCI) formats (e.g., the format of DCI used for scheduling downlink/uplink communications include a field of time domain resource assignment. The time domain resource assignment field may include a value m that provides a row index value of m+1 to a physical downlink shared channel (PDSCH) PDSCH-TimeDomainAllocationlist table in a DCI format for scheduling downlink communications. The time domain resource assignment field value m of the DCI provides a row index value m+1 to a physical uplink shared channel (PUSCH) as a PUSCH-TimeDomainAllocationlist table in a DCI format for scheduling uplink communications.

The PDSCH-TimeDomainResource Allocation defines a slot offset between a DCI (e.g., a DCI slot, or a first slot in which DCI is communicated) and its scheduled PDSCH value k0 (e.g., a PDSCH slot, or a first slot in which a PDSCH is communicated), the start and length indicator SLIV, a start symbol S, an allocation length L, and the PDSCH mapping type to be assumed in PDSCH reception. In certain embodiments, a K0 value can be one of the set {0, 1, 2, . . . , 32}.

The PUSCH-TimeDomainResource Allocation defines a slot offset between DCI (e.g., a DCI slot, or a first slot in which DCI is communicated) and its scheduled PUSCH k2 (e.g., a PUSCH slot, or a first slot in which PUSCH is communicated), the start and length indicator SLIV, or directly the start symbol S and the allocation length L, and the PUSCH mapping type to be applied in a PUSCH transmission. In certain embodiments, a K2 value can be one of the set {0, 1, 2, . . . , 32}.

When an aperiodic channel state information reference signal (CSI-RS) is used with aperiodic reporting, the CSI-RS offset is configured per resource set by the higher layer, also referred to a high layer, (e.g., layer 2 or higher in the open systems interconnection (OSI) model) parameter aperiodicTriggeringOffset. The parameter aperiodicTriggeringOffset may define an amount of slot offset between DCI (e.g., a DCI slot, or a first slot in which DCI is communicated) and its triggered aperiodic CSI-RS offset (e.g., aperiodic CSI-RS slot, or a first slot in which an aperiodic CSI-RS is communicated). In certain embodiments, a parameter k1 is a slot offset between a PDSCH to a downlink (DL) acknowledgement (ACK).

When k0>0/k2>0/A CSI-RS offset>0, DCI and its associated scheduled PDSCH/PUSCH/CSI-RS is not transmit in a same slot. Thus, terminals (e.g., a UE) can be in an power saving state before the communication of the PDSCH/PUSCH/CSI-RS. The power saving state may refer to a terminal (e.g., a UE) that turns off some part of a transmission, reception or processing module, for example to achieve power savings.

Typically, a terminal (e.g., a UE) can be in an power saving state based on slot offset information, such as k0 and/or A CSI-RS offset and/or k2, that is determined to be non-zero (e.g., greater than 0) by blind decoding of physical downlink control channel (PDCCH) candidates. The power saving state may refer to a terminal (e.g., a UE) that turns off some part of a transmission, reception or processing module, for example to achieve power savings.

Accordingly, various embodiments may achieve power savings by providing slot offset information to a UE prior to DCI so that a UE may achieve power savings by entering into an power saving state accordingly. This slot offset information may be, for example, information characterizing k0, k1, k2, or an aperiodic CSI-RS offset. For example, if k0>0 and k2>0 and A CSI-RS offset>0, a UE may then safely enter into an power saving state during the time in which the UE would otherwise be blind decoding of PDCCH candidates to find the slot offset information. As will be discussed further below, this slot offset information may encompass a slot offset information set (also referred to as a parameter set), a notation that a slot offset information set is of a first kind or a second kind, and/or slot offset information value(s).

In certain embodiments, a gNB (e.g., a BS) may send higher layer signaling (e.g., higher or high layer configuration signaling) to indicate a parameter set to a terminal (e.g., a UE) or to configure a parameter set at the terminal (e.g., the UE). The parameter set may also be referred to as a slot offset information set and be a kind of slot offset information. Stated another way, a BS may send high-layer configuration signaling to a UE, where the high-layer configuration signaling characterizes a slot offset information set of at least one offset from a downlink control information time slot to either a shared channel time slot or a reference signal time slot, or from a physical downlink shared channel time slot to a hybrid automatic repeat request acknowledgement time slot. Although certain embodiments may refer to the transmission or reception of this higher layer signaling, this higher layer signaling may not necessarily be sent or received in other embodiments. For example, as will be discussed further below, the non-transmission or non-reception of the higher layer signaling within a particular period of time may be utilized to determine whether slot offset information is of a first kind or a second kind.

Reference to high/higher layer signaling or high/higher level configuration signaling may refer to communications at layer 2 or higher in the open systems interconnection (OSI) model. For example, this high/higher layer signaling or high/higher level configuration signaling may be radio resource control (RRC) or a medium access control (MAC) control element (CE) signal. In certain embodiments, this RRC signal may be UE specific and the BS may send the RRC signal when the UE is re-establishing an RRC connection or upon the resumption of the RRC connection is triggered. In particular embodiments, information indicated by RRC signals is not changed in a next RRC signal (e.g., a next time RRC is re-established or resumed).

In certain embodiments, the slot offset information may be a value or an indication of non-zero status for an offset from a downlink control information time slot to either a shared channel slot (e.g., a PUSCH or PDSCH slot) or a reference signal slot (e.g., an aperiodic CSI-RS slot), or from a PDSCH time slot to a hybrid automatic repeat request (HARQ) acknowledgement (ACK) time slot.

In certain embodiments, a gNB (e.g., a BS) may indicate that it will be communicating using a first kind of parameter set or a second kind of parameter set based on predefined information and/or the higher layer configuration signaling used to indicate a parameter set to a terminal (e.g., a UE). Stated another way, a BS may determine, select, and/or transmit slot offset information as an indication that the offset from a downlink control information time slot is either a first kind of parameter (e.g., minimum slot offset can be set 0) or a second kind of parameter (e.g., minimum slot offset is 1 or more slots). This selection and/or transmission may be based on predefined information and/or the higher layer signaling used to indicate a parameter set to a UE. In certain embodiments, the BS may determine, based on the high-layer configuration signaling and/or predefined information, whether the slot offset information set is a first kind or a second kind.

In various embodiments, a BS may determine slot offset indication information that classifies a slot offset information set as either a first kind or a second kind. This may be based on at least one of high-layer configuration signaling and predefined information, as noted above. Also, the slot offset information set may characterizes an offset between one of: a downlink control information time slot and a physical downlink shared channel time slot (e.g., K0), a downlink control information time slot and a physical uplink shared channel time slot (e.g., K2), a triggering downlink control information time slot and an aperiodic non zero power channel state information reference signal (NZP CSI-RS) resources set time slot (e.g., an aperiodic CSI-RS offset), and a physical downlink shared channel time slot and a hybrid automatic repeat request acknowledgement time slot(e.g., K1). This slot offset indication information may then be sent to a UE.

In specific embodiments, the first kind of parameter set contains a set of parameters of the first kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the first kind of parameter set may have parameter k0 be greater than or equal to 0 and less than or equal to Nmax, where Nmax is a positive integer greater than 10. Also, the parameter k1 may be is greater than or equal to 0 and less than or equal to Nmax2, where Nmax2 is a positive integer greater than 10. Also, the parameter k2 may be greater than or equal to 0 and less than or equal to Nmax3, where Nmax3 is a positive integer greater than 10. Also, the parameter aperiodic CSI-RS offset may be greater than or equal to 0 and less than or equal to Nmax4, where Nmax4 is a positive integer greater than 10. Stated another way, the slot offset information set is the first kind when the at least one offset is greater than or equal to 0 and less than or equal to Nmax, where Nmax is a positive integer greater than 10.

In specific embodiments, the second kind of parameter set contains a set of parameters of the second kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the second kind of parameter set may have parameter k0 as greater than or equal to Nmin1 and less than or equal to Nmax1, where Nmin1 is an integer greater than 0, and Nmax1 is a positive integer greater than 10. Also, parameter k1 may be greater than or equal to Nmin2 and less than or equal to Nmax2, where Nmin2 is an integer greater than 0 and Nmax2 is a positive integer greater than 10. Also, parameter k2 may be greater than or equal to Nmin3 and less than or equal to Nmax3, where Nmin3 is an integer greater than 0, and Nmax3 is a positive integer greater than 10. Also, the parameter aperiodic CSI-RS offset may be greater than or equal to Nmin4 and less than or equal to Nmax4, where Nmin4 is an integer greater than 0 and Nmax4 is a positive integer greater than 10. Stated another way, the slot offset information set is the second kind when the at least one offset is greater than or equal to a threshold value and less than or equal to Nmax, wherein the threshold value is an integer greater than 0 and Nmax is a positive integer greater than 10.

In further embodiments, a gNB (e.g., a BS) may select a set of parameters from the selected parameter set. Stated another way, the BS may select one or more parameters (e.g., K0, K1, K2, aperiodic CSI-RS offset, and the like) from the determined, transmitted, or selected first kind or second kind of parameter set, as noted above. In certain embodiments, the BS may determine at least one slot offset information value from the slot offset information set (e.g., the set of parameters) from a first or second kind of parameter set.

In various embodiments, the gNB (e.g., the BS) may send a downlink control signal (e.g., DCI information) to a terminal (e.g., a UE), where the downlink control signal includes at least an index of the selected parameters (e.g., values associated with the selected parameters). Stated another way, the BS may send at least one slot offset information value to the UE in downlink control information. As noted above, a BS may send a downlink control signal (e.g., DCI information) to a UE when there is a grant for downlink or uplink.

As noted above, the indication or selection of the first kind of parameter set or the second kind of parameter set may be based on predefined information. In certain embodiments, this predefined information may include a parameter of a DCI format. In further embodiments, this predefined information may include a field in DCI which indicates a selection of a parameter set. In further embodiments, this predefined information may include a parameter in an extend field of a time domain resource assignment. In further embodiments, this predefined information may include (e.g., be based on) a power saving signal. In further embodiments, this predefined information may include a timer. In further embodiments, this predefined information may include a parameter of discontinuous reception (DRX). In further embodiments, this predefined information may include a parameter of a radio network temporary identity (RNTI). In further embodiments, this predefined information may include a traffic type. In further embodiments, this predefined information may include (e.g., be based on) UE capability. In further embodiments, this predefined information may include (e.g., be based on) higher layer signaling. In further embodiments, this predefined information may include (e.g., be based on) UE assistance information sent from a UE to a gNB (e.g., a BS).

In certain embodiments, the default value of Nmin1, Nmin2, Nmin3, and/or Nmin4 is one of the set {1, 2, 3 . . . , 10}. In further embodiments, the value of Nmin1, Nmin2, Nmin3, and/or Nmin4 can be configured by predefined information.

As noted above, in certain embodiments, a BS may send higher layer signaling to indicate a parameter set to a UE or to configure a parameter set at the UE. This parameter set may be indicated as, in certain embodiments, a second kind of parameter set. As a setting for the second kind of parameter set, when the parameter k0 is greater than or equal to zero, K0 may not be set as less than Nmin1, where Nmin1 may be greater than 0. As another setting for the second kind of parameter set, when the parameter k0 is greater than or equal to zero, an element that causes K0 to be less than Nmin1 may be reconfigured to be equal to Nmin1, where Nmin1 may be greater than or equal to 0. As another setting for the second kind of parameter set, when the parameter k0 is greater than or equal to Nmin1, Nmin1 may be greater than or equal to 0. As another setting for the second kind of parameter set, when the parameter k1 is greater than or equal to zero, Nmin2 may not be equal to zero. As another setting for the second kind of parameter set, when the parameter k1 is greater than or equal to zero in the parameter set, an element in which the parameter k1 is less than Nmin2 equal to zero is reconfigured as equal to Nmin2, where Nmin2 is greater than or equal to zero. As another setting for the second kind of parameter set, when the parameter k1 is greater than or equal to Nmin2, Nmin2 may be greater than or equal to 0. As another setting for the second kind of parameter set, when the parameter k2 is greater than or equal to zero, an element that causes K2 to be less than Nmin3 may not be selected. As another setting for the second kind of parameter set, when parameter k2 is greater than or equal to zero, the element which parameter k2 less than Nmin3 equal to zero is reconfigured equal to Nmin3. Nmin3 is greater than or equal to 0. As another setting for the second kind of parameter set, when parameter k2 is greater than or equal to Nmin3, Nmin3 may be set as greater than or equal to 0. As another setting for the second kind of parameter set, when parameter aperiodic CSI-RS offset is greater than or equal to zero, the element which causes parameter aperiodic CSI-RS offset to be less than Nmin4 and/or Nmin4 to be equal to zero cannot be selected. As another setting for the second kind of parameter set, when the parameter aperiodic CSI-RS offset is greater than or equal to zero, the element which causes the parameter aperiodic CSI-RS offset to be less than Nmin4 is reconfigured to be to equal to Nmin4, where Nmin4 is greater than or equal to 0. As another setting for the second kind of parameter set, when parameter aperiodic CSI-RS offset is greater than or equal to Nmin4, then Nmin4 may be set as greater than or equal to 0.

In certain embodiments, a timer may refer to a bwp-InactivityTimer and/or drx-onDurationTimer and/or drx-InactivityTimer.

In various embodiments, a parameter in an extend field of time domain resource assignment may include max 5 bits. If the field is 5 bits, the most significant bit (MSB) may indicate the selection of parameter set for a period time.

In certain embodiments, downlink control signaling which a gNB (e.g., a BS) may send to a terminal (e.g., a UE) may include at least the index of a selected parameter set and indicate the selection of the parameter set for a period of time.

In particular embodiments, a parameter of discontinuous reception (DRX) may include: drx-LongCycleStartOffset and/or drx-ShortCycle and/or drx-onDurationTimer and/or drx-InactivityTimer.

In certain embodiments, UE assistance information may include a desired parameter set.

In certain embodiments, UE assistance information may include a desired configuration for time domain resource allocation.

In certain embodiments, UE assistance information may include a delay budget report carrying desired increment/decrement in a Uu air interface delay and/or connected mode DRX cycle length.

In certain embodiments, a UE assistance information may include a desired k0, aperiodic CSI-RS offset and/or a k2 value. In certain embodiments, UE assistance information may include a desired minimum threshold for a k0, aperiodic CSI-RS offset and/or a k2.

In certain embodiments, predefined information may include a (related) parameter indicating a resource, and at least one of the following: a start time and a length of the time domain, and a number of physical resource blocks in the frequency domain, a bandwidth part index (BWP ID), control resource set index (CORESET ID), carrier index (carrier ID), subcarrier spacing (SCS), carrier aggregation, frequency range type (FR type), rank indication Value (RI), number of antenna ports (Port), and/or a precoding codebook index (PMI). In certain embodiments, this predefined information may include a UE is in power saving mode.

In various embodiments, a UE is in power saving mode may include at least one of the following: a scrambling method as a specific radio network temporary identifier (RNTI), the specific RNTI is used to indicate a power saving mode; and signaling to indicate when a UE is in power saving mode.

In certain embodiments, predefined information may indicate which kind of parameter set is enabled (e.g., selected or used), or threshold values for certain operations.

In certain embodiments, a UE or terminal may receive higher layer signaling (e.g., higher layer configuration signaling) that indicates a parameter set from a BS or to configure a parameter set at the terminal or UE. The parameter set may also be referred to as a slot offset information set and be a kind of slot offset information. Stated another way, a UE may receive high-layer configuration signaling, where the high-layer configuration signaling characterizes a slot offset information set of at least one offset from a downlink control information time slot to either a shared channel time slot or a reference signal time slot, or from a physical downlink shared channel time slot to a hybrid automatic repeat request acknowledgement time slot.

Although certain embodiments may refer to the reception of this higher layer signaling, this higher layer signaling may not necessarily received in other embodiments. For example, as will be discussed further below, the non-transmission or non-reception of the higher layer signaling within a particular period of time may be utilized to determine whether slot offset information is of a first kind or a second kind.

Reference to higher layer signaling or higher level configuration signaling may refer to communications at layer 2 or higher in the open systems interconnection (OSI) model. For example, this higher layer signaling or higher level configuration signaling may be radio resource control (RRC) or a medium access control (MAC) control element (CE) signal. In certain embodiments, this RRC signal may be UE specific and the UE may receive the RRC signal when the UE is re-establishing an RRC connection or upon the resumption of the RRC connection is triggered. In particular embodiments, information indicated by RRC signals is not changed in a next RRC signal (e.g., a next time RRC is re-established or resumed).

In certain embodiments, the slot offset information may be a value or an indication of non-zero status for an offset from a downlink control information time slot to either a shared channel slot (e.g., a PUSCH or PDSCH slot) or a reference signal slot (e.g., an aperiodic CSI-RS slot), or from a PDSCH time slot to a hybrid automatic repeat request (HARQ) acknowledgement (ACK) time slot.

In certain embodiments, the UE may receive an indication of, or the UE may determine, that it will be in communications using the first kind of parameter set or the second kind of parameter set based on predefined information and/or the higher layer signaling used to indicate a parameter set to a terminal (e.g., a UE). Stated another way, a UE may determine slot offset information as an indication that the offset from a downlink control information time slot is either a first kind of parameter (e.g., minimum slot offset can be set 0) or a second kind of parameter (e.g., minimum slot offset is 1 or more slot). This determination may be based on predefined information and/or the higher layer signaling used to indicate a parameter set to a UE. In certain embodiments, the UE may determine, based on the high-layer configuration signaling and/or predefined information, whether the slot offset information set is a first kind or a second kind.

In various embodiments, a BS may determine slot offset indication information that classifies a slot offset information set as either a first kind or a second kind. This may be based on at least one of high-layer configuration signaling and predefined information, as noted above. Also, the slot offset information set may characterizes an offset between one of: a downlink control information time slot and a physical downlink shared channel time slot (e.g., K0), a downlink control information time slot and a physical uplink shared channel time slot (e.g., K2), a triggering downlink control information time slot and an aperiodic non zero power channel state information reference signal (NZP CSI-RS) resources set time slot (e.g., an aperiodic CSI-RS offset), and a physical downlink shared channel time slot and a hybrid automatic repeat request acknowledgement time slot(e.g., K1). This slot offset indication information may then be sent to a UE. Accordingly, the UE may determine that the slot offset information set is either a first kind or a second kind based on the reception of the slot offset indication information from the BS.

In specific embodiments, the first kind of parameter set contains a set of parameters of the first kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the first kind of parameter set may have parameter k0 be greater than or equal to 0 and less than or equal to Nmax, where Nmax is a positive integer greater than 10. Also, the parameter k1 may be is greater than or equal to 0 and less than or equal to Nmax2, where Nmax2 is a positive integer greater than 5. Also, the parameter k2 may be greater than or equal to 0 and less than or equal to Nmax3, where Nmax3 is a positive integer greater than 10. Also, the parameter aperiodic CSI-RS offset may be greater than or equal to 0 and less than or equal to Nmax4, where Nmax4 is a positive integer greater than 10. Stated another way, the slot offset information set is the first kind when the at least one offset is greater than or equal to 0 and less than or equal to Nmax, where Nmax is a positive integer greater than 10.

In specific embodiments, the second kind of parameter set contains a set of parameters of the second kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the second kind of parameter set may have parameter k0 as greater than or equal to Nmin1 and less than or equal to Nmax1, where Nmin1 is an integer greater than 0, and Nmax1 is a positive integer greater than 10. Also, parameter k1 may be greater than or equal to Nmin2 and less than or equal to Nmax2, where Nmin2 is an integer greater than 0 and Nmax2 is a positive integer greater than 5. Also, parameter k2 may be greater than or equal to Nmin3 and less than or equal to Nmax3, where Nmin3 is an integer greater than 0, and Nmax3 is a positive integer greater than 10. Also, the parameter aperiodic CSI-RS offset may be greater than or equal to Nmin4 and less than or equal to Nmax4, where Nmin4 is an integer greater than 0 and Nmax4 is a positive integer greater than 10. Stated another way, the slot offset information set is the second kind when the at least one offset is greater than or equal to a threshold value and less than or equal to Nmax, wherein the threshold value is an integer greater than 0 and Nmax is a positive integer greater than 10.

In further embodiments, a gNB (e.g., a BS) may select a set of parameters from the selected parameter set. Stated another way, the BS may select one or more parameters (e.g., K0, K1, K2, aperiodic CSI-RS offset, and the like) from the indicated, determined, selected, or transmitted first or second kind of parameter set. In certain embodiments, the BS may determine at least one slot offset information value from the slot offset information set (e.g., the set of parameters) from the indicated, determined, selected, or transmitted first or second kind of parameter set.

In various embodiments, the UE may receive a downlink control signal (e.g., DCI information), where the downlink control signal includes at least an index of the selected parameters (e.g., values associated with the selected parameters). Stated another way, the UE may receive at least one slot offset information value from a BS in downlink control information. As noted above, a BS may send a downlink control signal (e.g., DCI information) to the UE when there is a grant for downlink or uplink.

Figure 3:
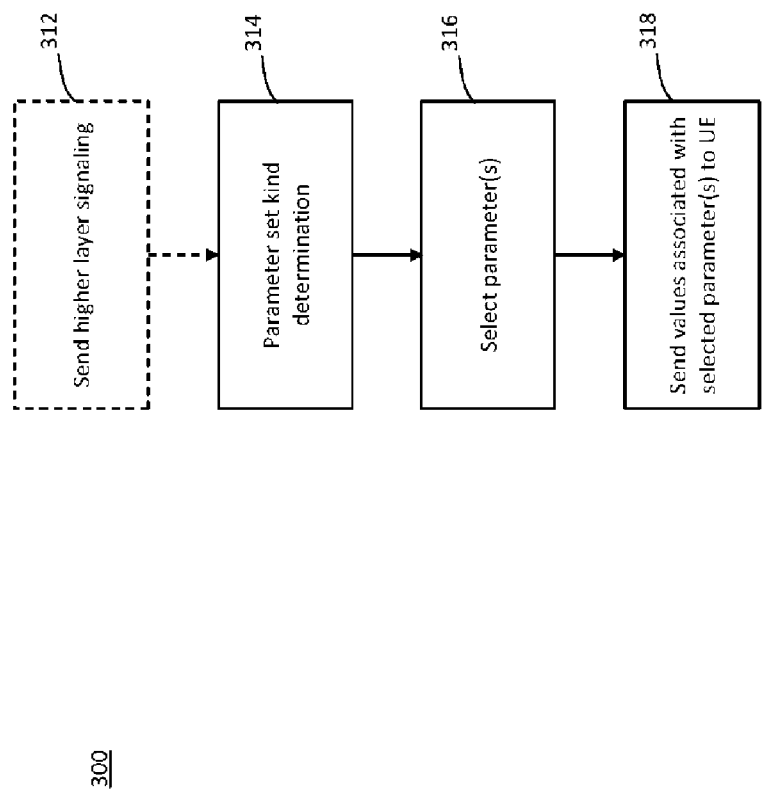
FIG. 3 is a diagram illustrating a base station based slot offset information communication process, in accordance with some embodiments.

FIG. 3 is a diagram illustrating a base station based slot offset information communication process 300, in accordance with some embodiments. The process 300 may be performed by a BS. It is noted that the process 300 is merely an example, and is not intended to limit the present disclosure. Accordingly, it is understood that additional operations (e.g., blocks) may be provided before, during, and after the process 300 of FIG. 3, certain operations may be omitted, certain operations may be performed concurrently with other operations, and that some other operations may only be briefly described herein. At operation 312, a BS may send higher layer signaling (e.g., higher layer configuration signaling) to indicate a parameter set to a UE or to configure a parameter set at the UE. The parameter set may also be referred to as a slot offset information set and be a kind of slot offset information. Stated another way, a BS may send high-layer configuration signaling to a UE, where the high-layer configuration signaling characterizes a slot offset information set of at least one offset from a downlink control information time slot to either a shared channel time slot or a reference signal time slot, or from a physical downlink shared channel time slot to a hybrid automatic repeat request acknowledgement time slot.

In various embodiments, operation 312 may be optional. Therefore, operation 312 is illustrated in phantom. Although certain embodiments may refer to the transmission or reception of this higher layer signaling, this higher layer signaling may not necessarily received in other embodiments. For example, as will be discussed further below, the non-transmission or non-reception of the higher layer signaling within a particular period of time may be utilized to determine whether slot offset information is of a first kind or a second kind.

Reference to higher layer signaling or higher level configuration signaling may refer to communications at layer 2 or higher in the open systems interconnection (OSI) model. For example, this higher layer signaling or higher level configuration signaling may be radio resource control (RRC) or a medium access control (MAC) control element (CE) signal. In certain embodiments, this RRC signal may be UE specific and the BS may send the RRC signal when the UE is re-establishing an RRC connection or upon the resumption of the RRC connection is triggered. In particular embodiments, information indicated by RRC signals is not changed in a next RRC signal (e.g., a next time RRC is re-established or resumed).

At operation 314, the BS may indicate the first kind of parameter set or the second kind of parameter set based on predefined information and/or the higher layer signaling used to indicate a parameter set to the UE. Stated another way, the BS may determine, select, and/or transmit slot offset information as an indication that the offset from a downlink control information time slot is either a first kind of parameter (e.g., minimum slot offset can be set 0) or a second kind of parameter (e.g., minimum slot offset is 1 or more slot). This determination, selection and/or transmission may be based on predefined information and/or the higher layer signaling used to indicate a parameter set to a UE. In certain embodiments, the BS may determine, based on the high-layer configuration signaling and/or predefined information, whether the slot offset information set is a first kind or a second kind.

Accordingly, in various embodiments with reference to operation 314, a BS may determine slot offset indication information that classifies a slot offset information set as either a first kind or a second kind. This may be based on at least one of high-layer configuration signaling and pre-defined information, as noted above. Also, the slot offset information set may characterizes an offset between one of: a downlink control information time slot and a physical downlink shared channel time slot (e.g., K0), a downlink control information time slot and a physical uplink shared channel time slot (e.g., K2), a triggering downlink control information time slot and an aperiodic non zero power channel state information reference signal (NZP CSI-RS) resources set time slot (e.g., an aperiodic CSI-RS offset), and a physical downlink shared channel time slot and a hybrid automatic repeat request acknowledgement time slot (e.g., K1). This slot offset indication information may then be sent to a UE.

In specific embodiments, the first kind of parameter set contains a set of parameters of the first kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the first kind of parameter set may have parameter k0 be greater than or equal to 0 and less than or equal to Nmax, where Nmax is a positive integer greater than 10. Also, the parameter k1 may be is greater than or equal to 0 and less than or equal to Nmax2, where Nmax2 is a positive integer greater than 10. Also, the parameter k2 may be greater than or equal to 0 and less than or equal to Nmax3, where Nmax3 is a positive integer greater than 10. Also, the parameter aperiodic CSI-RS offset may be greater than or equal to 0 and less than or equal to Nmax4, where Nmax4 is a positive integer greater than 10. Stated another way, the slot offset information set is the first kind when the at least one offset is greater than or equal to 0 and less than or equal to Nmax, where Nmax is a positive integer greater than 10.

In specific embodiments, the second kind of parameter set contains a set of parameters of the second kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the second kind of parameter set may have parameter k0 as greater than or equal to Nmin1 and less than or equal to Nmax1, where Nmin1 is an integer greater than 0, and Nmax1 is a positive integer greater than 10. Also, parameter k1 may be greater than or equal to Nmin2 and less than or equal to Nmax2, where Nmin2 is an integer greater than 0 and Nmax2 is a positive integer greater than 10. Also, parameter k2 may be greater than or equal to Nmin3 and less than or equal to Nmax3, where Nmin3 is an integer greater than 0, and Nmax3 is a positive integer greater than 10. Also, the parameter aperiodic CSI-RS offset may be greater than or equal to Nmin4 and less than or equal to Nmax4, where Nmin4 is an integer greater than 0 and Nmax4 is a positive integer greater than 10. Stated another way, the slot offset information set is the second kind when the at least one offset is greater than or equal to a threshold value and less than or equal to Nmax, wherein the threshold value is an integer greater than 0 and Nmax is a positive integer greater than 10.

At operation 316, the BS may select a set of parameters from the selected parameter set. Stated another way, the BS may select one or more parameters (e.g., K0, K1, K2, aperiodic CSI-RS offset, and the like) from the selected kind of parameter set of operation 314. In certain embodiments, the BS may determine at least one slot offset information value from the slot offset information set (e.g., the set of parameters) of the indicated, determined, selected, or transmitted first or second kind of parameter set.

At operation 318, the BS may send a downlink control signal (e.g., DCI information) to the UE, where the downlink control signal includes at least an index of the selected parameters (e.g., values associated with the selected parameters). Stated another way, the BS may send at least one slot offset information value to the UE in downlink control information. As noted above, a BS may send a downlink control signal (e.g., DCI information) to a UE when there is a grant for downlink or uplink.

Figure 4:
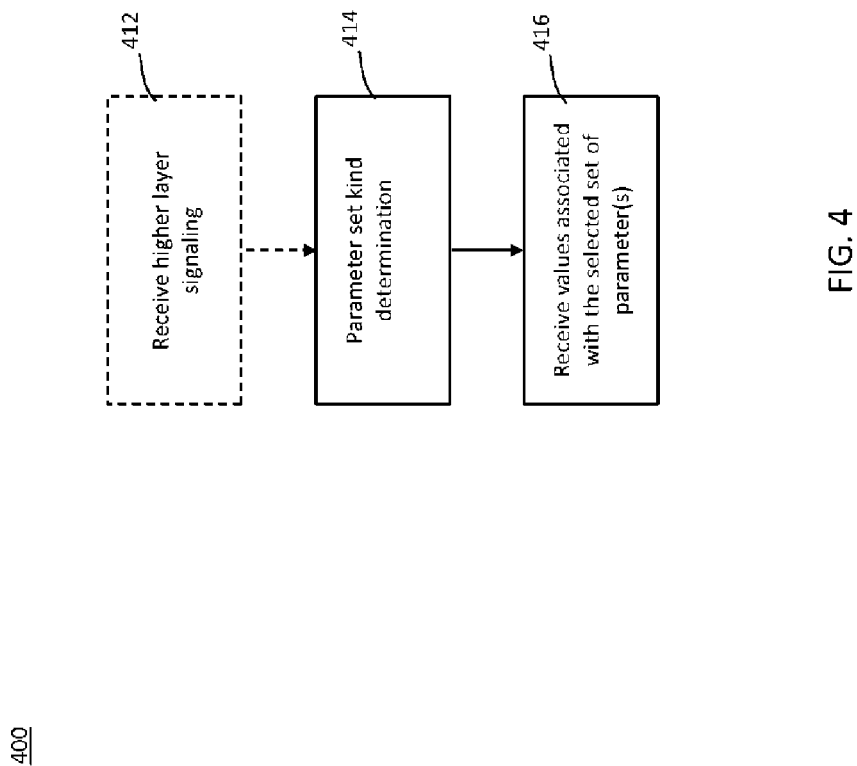
FIG. 4 is a diagram illustrating a user equipment based slot offset information communication process, in accordance with some embodiments.

FIG. 4 is a diagram illustrating a user equipment based slot offset information communication process 400, in accordance with some embodiments. The process 400 may be performed by a UE. It is noted that the process 400 is merely an example, and is not intended to limit the present disclosure. Accordingly, it is understood that additional operations (e.g., blocks) may be provided before, during, and after the process 400 of FIG. 4, certain operations may be omitted, certain operations may be performed concurrently with other operations, and that some other operations may only be briefly described herein.

At operation 412, a UE or terminal may receive higher layer signaling (e.g., higher layer configuration signaling) that indicates a parameter set from a BS or to configure a parameter set at the terminal or UE. The parameter set may also be referred to as a slot offset information set and be a kind of slot offset information. Stated another way, a UE may receive high-layer configuration signaling, where the high-layer configuration signaling characterizes a slot offset information set of at least one offset from a downlink control information time slot to either a shared channel time slot or a reference signal time slot, or from a physical downlink shared channel time slot to a hybrid automatic repeat request acknowledgement time slot.

In various embodiments, operation 412 may be optional. Therefore, operation 412 is illustrated in phantom. Although certain embodiments may refer to the reception of this higher layer signaling, this higher layer signaling may not necessarily received in other embodiments. For example, as will be discussed further below, the non-reception of the higher layer signaling within a particular period of time may be utilized to determine whether slot offset information is of a first kind or a second kind.

Reference to higher layer signaling or higher level configuration signaling may refer to communications at layer 2 or higher in the open systems interconnection (OSI) model. For example, this higher layer signaling or higher level configuration signaling may be radio resource control (RRC) or a medium access control (MAC) control element (CE) signal. In certain embodiments, this RRC signal may be UE specific and the UE may receive the RRC signal when the UE is re-establishing an RRC connection or upon the resumption of the RRC connection is triggered. In particular embodiments, information indicated by RRC signals is not changed in a next RRC signal (e.g., a next time RRC is re-established or resumed).

In certain embodiments, the slot offset information may be a value or an indication of non-zero status for an offset from a downlink control information time slot to either a shared channel slot (e.g., a PUSCH or PDSCH slot) or a reference signal slot (e.g., an aperiodic CSI-RS slot), or from a PDSCH time slot to a hybrid automatic repeat request (HARQ) acknowledgement (ACK) time slot.

At operation 414, the UE may receive an indication of, or the UE may determine, that it will be communicating with the first kind of parameter set or the second kind of parameter set based on predefined information and/or the higher layer signaling used to indicate a parameter set to a terminal (e.g., a UE). Stated another way, a UE may determine slot offset information as an indication that the offset from a downlink control information time slot is either a first kind of parameter (e.g., minimum slot offset can be set 0) or a second kind of parameter (e.g., minimum slot offset is 1 or more slots). This determination may be based on predefined information and/or the higher layer signaling used to indicate a parameter set to a UE. In certain embodiments, the UE may determine, based on the high-layer configuration signaling and/or predefined information, whether the slot offset information set is a first kind or a second kind.

In various embodiments, a BS may determine slot offset indication information that classifies a slot offset information set as either a first kind or a second kind. This may be based on at least one of high-layer configuration signaling and predefined information, as noted above. Also, the slot offset information set may characterizes an offset between one of: a downlink control information time slot and a physical downlink shared channel time slot (e.g., K0), a downlink control information time slot and a physical uplink shared channel time slot (e.g., K2), a triggering downlink control information time slot and an aperiodic non zero power channel state information reference signal (NZP CSI-RS) resources set time slot (e.g., an aperiodic CSI-RS offset), and a physical downlink shared channel time slot and a hybrid automatic repeat request acknowledgement time slot (e.g., K1). This slot offset indication information may then be sent to a UE. Accordingly, with reference to operation 414, the UE may determine that the slot offset information set is either a first kind or a second kind based on the reception of the slot offset indication information from the BS.

In specific embodiments, the first kind of parameter set contains a set of parameters of the first kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the first kind of parameter set may have parameter k0 be greater than or equal to 0 and less than or equal to Nmax, where Nmax is a positive integer greater than 10. Also, the parameter k1 may be is greater than or equal to 0 and less than or equal to Nmax2, where Nmax2 is a positive integer greater than 10. Also, the parameter k2 may be greater than or equal to 0 and less than or equal to Nmax3, where Nmax3 is a positive integer greater than 10. Also, the parameter aperiodic CSI-RS offset may be greater than or equal to 0 and less than or equal to Nmax4, where Nmax4 is a positive integer greater than 10. Stated another way, the slot offset information set is the first kind when the at least one offset is greater than or equal to 0 and less than or equal to Nmax, where Nmax is a positive integer greater than 10.

In specific embodiments, the second kind of parameter set contains a set of parameters of the second kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the second kind of parameter set may have parameter k0 as greater than or equal to Nmin1 and less than or equal to Nmax1, where Nmin1 is an integer greater than 0, and Nmax1 is a positive integer greater than 10. Also, parameter k1 may be greater than or equal to Nmin2 and less than or equal to Nmax2, where Nmin2 is an integer greater than 0 and Nmax2 is a positive integer greater than 10. Also, parameter k2 may be greater than or equal to Nmin3 and less than or equal to Nmax3, where Nmin3 is an integer greater than 0, and Nmax3 is a positive integer greater than 10. Also, the parameter aperiodic CSI-RS offset may be greater than or equal to Nmin4 and less than or equal to Nmax4, where Nmin4 is an integer greater than 0 and Nmax4 is a positive integer greater than 10. Stated another way, the slot offset information set is the second kind when the at least one offset is greater than or equal to a threshold value and less than or equal to Nmax, wherein the threshold value is an integer greater than 0 and Nmax is a positive integer greater than 10.

In further embodiments, a gNB (e.g., a BS) may select a set of parameters from the selected parameter set. Stated another way, the BS may select one or more parameters (e.g., K0, K1, K2, aperiodic CSI-RS offset, and the like) from the indicated, determined, selected, or transmitted first or second kind of parameter set. In certain embodiments, the BS may determine at least one slot offset information value from the slot offset information set (e.g., the set of parameters) from the indicated, determined, selected, or transmitted first or second kind of parameter set.

At operation 416, the UE may receive a downlink control signal (e.g., DCI information), where the downlink control signal includes at least an index of the selected parameters (e.g., values associated with the selected parameters). Stated another way, the UE may receive at least one slot offset information value from a BS in downlink control information. As noted above, a BS may send a downlink control signal (e.g., DCI information) to the UE when there is a grant for downlink or uplink.

As noted above, In certain embodiments, a gNB (e.g., a BS) may send higher layer signaling (e.g., higher or high layer configuration signaling) to indicate a parameter set to a terminal (e.g., a UE) or to configure a parameter set at the terminal (e.g., the UE). The parameter set may also be referred to as a slot offset information set and be a kind of slot offset information. Stated another way, a BS may send high-layer configuration signaling to a UE, where the high-layer configuration signaling characterizes a slot offset information set of at least one offset from a downlink control information time slot to either a shared channel time slot or a reference signal time slot, or from a physical downlink shared channel time slot to a hybrid automatic repeat request acknowledgement time slot.

Although certain embodiments may refer to the transmission or reception of this higher layer signaling, this higher layer signaling may not necessarily received in other embodiments. For example, as will be discussed further below, the non-transmission or non-reception of the higher layer signaling within a particular period of time may be utilized to determine whether slot offset information is of a first kind or a second kind.

Reference to high/higher layer signaling or high/higher level configuration signaling may refer to communications at layer 2 or higher in the open systems interconnection (OSI) model. For example, this high/higher layer signaling or high/higher level configuration signaling may be radio resource control (RRC) or a medium access control (MAC) control element (CE) signal. In certain embodiments, this RRC signal may be UE specific and the BS may send the RRC signal when the UE is re-establishing an RRC connection or upon the resumption of the RRC connection is triggered. In particular embodiments, information indicated by RRC signals is not changed in a next RRC signal (e.g., a next time RRC is re-established or resumed).

In certain embodiments, the slot offset information may be a value or an indication of non-zero status for an offset from a downlink control information time slot to either a shared channel slot (e.g., a PUSCH or PDSCH slot) or a reference signal slot (e.g., an aperiodic CSI-RS slot), or from a PDSCH time slot to a hybrid automatic repeat request (HARQ) acknowledgement (ACK) time slot.

In certain embodiments, a gNB (e.g., a BS) may indicate that it will be communicating with a first kind of parameter set or a second kind of parameter set based on predefined information and/or the higher layer signaling used to indicate a parameter set to a terminal (e.g., a UE). Stated another way, a BS may determine, select, and/or transmit slot offset information as an indication that the offset from a downlink control information time slot is either a first kind of parameter (e.g., minimum slot offset can be set 0) or a second kind of parameter (e.g., minimum slot offset is 1 or more slots). This selection and/or transmission may be based on predefined information and/or the higher layer signaling used to indicate a parameter set to a UE. In certain embodiments, the BS may determine, based on the high-layer configuration signaling and predefined information, whether the slot offset information set is a first kind or a second kind.

Accordingly, a BS may determine slot offset indication information that classifies a slot offset information set as either a first kind or a second kind. This may be based on at least one of high-layer configuration signaling and predefined information, as noted above. Also, the slot offset information set may characterizes an offset between one of: a downlink control information time slot and a physical downlink shared channel time slot (e.g., K0), a downlink control information time slot and a physical uplink shared channel time slot (e.g., K2), a triggering downlink control information time slot and an aperiodic non zero power channel state information reference signal (NZP CSI-RS) resources set time slot (e.g., an aperiodic CSI-RS offset), and a physical downlink shared channel time slot and a hybrid automatic repeat request acknowledgement time slot (e.g., K1). This slot offset indication information may then be sent to a UE.

In specific embodiments, the first kind of parameter set contains a set of parameters of the first kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the first kind of parameter set may have parameter k0 be greater than or equal to 0 and less than or equal to Nmax, where Nmax is a positive integer greater than 10. Also, the parameter k1 may be is greater than or equal to 0 and less than or equal to Nmax2, where Nmax2 is a positive integer greater than 10. Also, the parameter k2 may be greater than or equal to 0 and less than or equal to Nmax3, where Nmax3 is a positive integer greater than 10. Also, the parameter aperiodic CSI-RS offset may be greater than or equal to 0 and less than or equal to Nmax4, where Nmax4 is a positive integer greater than 10. Stated another way, the slot offset information set is the first kind when the at least one offset is greater than or equal to 0 and less than or equal to Nmax, where Nmax is a positive integer greater than 10.

In specific embodiments, the second kind of parameter set contains a set of parameters of the second kind. The set of parameters includes at least one of the following parameters: a slot offset between DCI and its scheduled PDSCH (e.g., the parameter k0), a slot offset between DCI and its scheduled PUSCH (e.g., the parameter k2), a slot offset between a PDSCH to a DL ACK (e.g., the parameter k1), a parameter of an offset between the slot containing the downlink control information that triggers a set of aperiodic NZP CSI-RS resources and the slot in which the CSI-RS resource set is transmitted (e.g., the parameter A CSI-RS offset, or an aperiodic CSI-RS offset). In certain embodiments, the second kind of parameter set may have parameter k0 as greater than or equal to Nmin1 and less than or equal to Nmax1, where Nmin1 is an integer greater than 0, and Nmax1 is a positive integer greater than 10. Also, parameter k1 may be greater than or equal to Nmin2 and less than or equal to Nmax2, where Nmin2 is an integer greater than 0 and Nmax2 is a positive integer greater than 10. Also, parameter k2 may be greater than or equal to Nmin3 and less than or equal to Nmax3, where Nmin3 is an integer greater than 0, and Nmax3 is a positive integer greater than 10. Also, the parameter aperiodic CSI-RS offset may be greater than or equal to Nmin4 and less than or equal to Nmax4, where Nmin4 is an integer greater than 0 and Nmax4 is a positive integer greater than 10. Stated another way, the slot offset information set is the second kind when the at least one offset is greater than or equal to a threshold value and less than or equal to Nmax, wherein the threshold value is an integer greater than 0 and Nmax is a positive integer greater than 10.

In further embodiments, a gNB (e.g., a BS) may select a set of parameters from the selected parameter set. Stated another way, the BS may select one or more parameters (e.g., K0, K1, K2, aperiodic CSI-RS offset, and the like) from the determined, transmitted, or selected first kind or second kind of parameter set, as noted above. In certain embodiments, the BS may determine at least one slot offset information value from the slot offset information set (e.g., the set of parameters) from a first or second kind of parameter set.

In various embodiments, the gNB (e.g., the BS) may send a downlink control signal (e.g., DCI information) to a terminal (e.g., a UE), where the downlink control signal includes at least an index of the selected parameters (e.g., values associated with the selected parameters). Stated another way, the BS may send at least one slot offset information value to the UE in downlink control information. As noted above, a BS may send a downlink control signal (e.g., DCI information) to a UE when there is a grant for downlink or uplink.

In certain embodiments, a threshold value may be associated with at least one of the following: an identifier for a bandwidth part (BWP-id), a bandwidth part (BWP) transition latency, a physical downlink shared channel (PDSCH) decoding time, a physical uplink shared channel (PUSCH) preparation time, a quasi-co-location (QCL) type, a sub carrier spacing (SCS), and a capability of a UE. In further embodiments, if the first SCS is greater than a second SCS, then the threshold value for the first SCS is greater than the threshold value for the second SCS. In further embodiments, the threshold value is greater than the BWP transition latency. In further embodiments, the threshold value is an integer less than 10.

In various embodiments, the predefined information mentioned above may include a parameter of the DCI format. This DCI format may comprise at least one of following parameters: DCI format 0_0, DCI format 0_1, DCI format 1_0, DCI format 1_1, DCI format 2_0, DCI format 2_1, DCI format 2_2, DCI format 2_3, a specific DCI format. In further embodiments, if the DCI format parameter is a specific DCI format (e.g., specific DCI format is used to indicate a power saving mode), then the second kind of parameter set may be selected.

In various embodiments, the predefined information mentioned above may include a field in DCI that indicates the selection of a parameter set. This field in DCI may have one bit that indicates the selection of a parameter set for a period of time. A value in the field of 0 or 1 may indicate a selection of the first kind or the second kind of parameter set (e.g., the first kind of the second kind of a slot offset information set). The further embodiments, a field may contain a parameter X. The number of bits in the field can be selected from the set {1, 2, . . . , N}. Also, N may be a parameter correlated with a value of X, where X indicates the selection of a parameter set for a period of time.

In certain embodiments, the predefined information mentioned above may include a parameter in an extend field of a time domain resource assignment. This parameter in an extend field of a time domain resource assignment include a maximum of 5 bits. If the field is 5 bits, a most significant bit (MSB) may indicate the selection of the parameter set for a period of time.

In certain embodiments, the predefined information mentioned above may include a power saving signal. This power saving signal may include a wake-up signal and a signal configured with a specific RNTI (e.g., a specific RNTI used for indicate a power saving mode) scrambling method. In further embodiments, this power saving signal is used to carry information to indicate a parameter set. The information is threshold values (or the minimum slot offset values) configured for a slot offset, where only the slot offset larger than or equal to the threshold value can be used. The threshold values may include at least one of the threshold values for k0, k1, k2, and aperiodic CSI-RS offset. In further embodiments, this power saving signal is used to carry information to indicate a parameter set. The information is 0 or 1 may indicate a selection of the first kind or the second kind of parameter set (e.g., the first kind of the second kind of a slot offset information set).

In certain embodiments, the predefined information mentioned above may include a timer. This timer may include a bwp-InactivityTimer and/or drx-onDurationTimer and/or drx-InactivityTimer. The bwp-InactivityTimer may define a duration in milliseconds after which the UE falls back to the default bandwidth part. The drx-onDurationTimer may define the duration at the beginning of a DRX Cycle. The drx-InactivityTimer may define the duration after the PDCCH occasion in which a PDCCH indicates a new UL or DL transmission for the MAC entity. In a further embodiment, after an expiration of a bwp-InactivityTime, the second kind of parameter set may be selected. In further embodiment, if a bwp-InactivityTimer is running, the first kind of parameter set may be selected. In further embodiments, if a drx-onDurationTimer is running and a drx-onDurationTimer value is greater than a threshold, a second kind of parameter set may be selected; otherwise, the first kind of parameter set may be selected. In further embodiments, if a drx-InactivityTimer is running, the second kind of parameter set may be selected; otherwise, the first kind of parameter set may be selected.

In certain embodiments, predefined information mentioned above may include a parameter of discontinuous reception (DRX). The parameter of discontinuous reception (DRX) may include a drx-LongCycleStartOffset and/or drx-ShortCycle and/or drx-onDurationTimer and/or drx-InactivityTimer. The drx-onDurationTimer may refer to the duration at the beginning of a DRX Cycle. The drx-Inactivity Timer may refer to the duration after the PDCCH occasion in which a PDCCH indicates a new UL or DL transmission for the MAC entity. The drx-LongCycleStartOffset may refer to the Long DRX cycle. The drx-StartOffset may refer to the subframe where the long and short DRX Cycle starts. The drx-ShortCycle (optional) may refer to the short DRX cycle. The value in drx-LongCycleStartOffset and/or drx-ShortCycle and/or drx-onDurationTimer and/or drx-InactivityTimer can indicate the selection of parameter set. If drx-LongCycleStartOffset indicate a long DRX cycle larger than a threshold and/or drx-ShortCycle indicate cycle larger than a threshold and/or drx-onDurationTimer value larger than a threshold and/or drx-InactivityTimer value larger than a threshold, the second kind of parameter set is enabled.

In certain embodiments, the predefined information mentioned above may include a parameter of a radio network temporary identity (RNTI).

In certain embodiments, the predefined information mentioned above may include a scrambling method configured for PDCCH. The scrambling method configured for PDCCH may comprise at least one of following parameters: C-RNTI (Cell Radio Network Temporary Identifier), MCS-C-RNTI (Modulation and coding scheme C-RNTI), TC-RNTI (temporary C-RNTI), SP-CSI-RNTI (Semi-Persistent Channel State Information RNTI), CS-RNTI (Configured Scheduling RNTI), RA-RNTI (Random access-RNTI). In further embodiments, if the scrambling method is a specific RNTI (e.g., a specific RNTI used to indicate power saving mode), the second kind of parameter set may be selected, otherwise the first kind of parameter set may be selected.

In certain embodiments, the predefined information mentioned above may include a traffic type. A parameter of the traffic type may be a quality of service (QOS). In further embodiments, the QoS may be a 5G QoS characteristic associated with a 5G QoS indicator (5QI). The characteristics may describe a packet forwarding treatment that a QoS flow receives edge-to-edge between the UE and a user plane function (UPF) in terms of at least one of the following performance characteristics: a resource type (e.g., a guaranteed bearer rate (GBR), a delay critical GBR or a non-GBR); a priority level; a packet delay budget; a packet error rate; an averaging window (e.g., for GBR and delay-critical GBR resource types); and a maximum data burst volume (e.g., for delay-critical GBR resource types). In further embodiments, if the traffic type is delay critical, then the first kind of parameter set may be selected.

In certain embodiments, the predefined information mentioned above may include UE capability. If the UE can support the second kind of parameter set, then the second kind of parameter set may be selected. Otherwise, the first kind of parameter set may be selected.

In certain embodiments, the predefined information mentioned above may include higher layer information. This higher layer information may include a higher layer parameter mcs-Table given by PDSCH-Config set to qam64LowSE (e.g., where the modulation and coding scheme (MCS) table in PDSCH configuration is qam64LowSE). If so, then the first kind of parameter set may be selected. In further embodiments, this higher layer signaling may include the higher layer parameter mcs-Table given by PUSCH-Config set to qam64LowSE (e.g., the MCS table in PUSCH configuration is qam64LowSE). If so, then the first kind of parameter set may be selected. In further embodiments, this higher layer signaling may include a higher layer parameter mcs-Table given by SPS-Config set to qam64LowSE. If so, then the first kind of parameter set may be selected. In further embodiments, this higher layer signaling may include the higher layer parameter mes-Table given by ConfiguredGrantConfig set to qam64LowSE. If so, then the first kind of parameter set may be selected.

In certain embodiments, the predefined information may include high layer signaling. This high layer signaling may be a RRC or/MAC CE signal. In further embodiments, the high layer signaling is BWP specific. In further embodiments, the high layer signaling may include a parameter which can indicate which kind of parameter set is enabled. In further embodiments, if the high layer signaling is not present, the first kind of parameter set is enabled (e.g., selected or used).

In certain embodiments, a value of 0 or 1 may indicate the first kind of parameter set or the second kind of parameter set. In further embodiments, a parameter may be a threshold value (or the minimum slot offset value) configured for slot offset, where only the slot offset larger than or equal to the threshold value can be used. The threshold values may include at least one of the threshold values for k0, k1, k2, and an aperiodic CSI-RS offset. In further embodiments, the threshold values can be set as the value of Nmin1 and/or Nmin2 and/or Nmin3 and/or Nmin4. In further embodiments, the predefined information mentioned above may include UE assistance information that a UE sends to a gNB (e.g., a BS). In further embodiments, the UE assistance information may include a desired parameter set. In further embodiments, the UE assistance information may include a desired configuration for time domain resource allocation, if k0 or k2 is greater than 0 in a time domain resource allocation, then the second kind of parameter set is selected, otherwise, the first kind of parameter set is selected. In further embodiments, UE assistance information may include a delay budget report carrying a desired increment/decrement in a Uu air interface delay or a connected mode DRX cycle length.

In certain embodiments, a delay BudgetRepor may indicates a UE-preferred adjustment to connected mode DRX. If a desired DRX cycle is greater than a threshold, the second kind of parameter set is selected, otherwise the first kind of parameter set is selected.

In certain embodiments, a UE assistance information may include a desired k0/A CSI-RS offset/k2 value. If the desired k0, aperiodic CSI-RS offset, or k2 is greater than 0, the second kind of parameter set is selected, otherwise the first kind of parameter set is selected.

In certain embodiments, UE assistance information may include a desired minimum threshold for k0, aperiodic CSI-RS offset, or k2. If the desired minimum threshold for k0, aperiodic CSI-RS offset, or k2 is greater than 0, then the second kind of parameter set is selected, otherwise the first kind of parameter set is selected.

In certain embodiments, UE assistance information may include desired BWP information. If the desired BWP is greater than a threshold, then the first kind of parameter set is selected, otherwise the second kind of parameter set is selected.

In certain embodiments, downlink control signaling in which a gNB (e.g., a BS) sends to a UE (e.g., a terminal) may include at least an index of a selected parameter set mentioned above or may indicate the selection of a parameter set for a period of time. The period of time may be indicated by signaling is at least one of the following: a timer which is the length of time indicated by signaling; and aperiodic signaling where the length of time indicated by the signaling is infinity. In further embodiments, a UE may reselect a selection of a parameter set only after receiving the predefined signaling. In further embodiments, the signaling is sent over a periodic T, which may indicate a length of time.

In specific embodiments, a gNB (e.g., a BS) may perform four exemplary operations. As a first exemplary operation, the gNB (e.g., the BS) may send higher layer signaling indicate parameters to a terminal (e.g., a UE).

Although certain embodiments may refer to the transmission or reception of this higher layer signaling, this higher layer signaling may not necessarily received in other embodiments. For example, as will be discussed further below, the non-transmission or non-reception of the higher layer signaling within a particular period of time may be utilized to determine whether slot offset information is of a first kind or a second kind.

As a second exemplary operation, the gNB (e.g., the BS) may select a first kind of parameter set or a second kind of parameter set based on the higher layer signaling mentioned before and predefined information. This predefined information may be parameter in an extend field of a time domain resource assignment mentioned above and include a maximum of 5 bits. If the field is 5 bits, the MSB may be used to indicate the selection of parameter set for a period of time. For example, a MSB of 1 may indicate a selection of the second kind of parameter set for a period of time.

In certain embodiments, a terminal or UE may not get the number of bits of a time domain resource assignment field in DCI before decoding the DCI. For example, the number of bits of the time domain resource assignment field in the DCI may not be the same as the number considered by the terminal or UE (e.g., when the terminal consider 3 bits of the time domain resource assignment field in DCI while there are 4 bits of the time domain resource assignment field in the DCI).

In certain embodiments, for the number of bit of a time domain resource assignment field in DCI, if a number considered by the UE or terminal is greater than the number in DCI, the terminal prepends zero to a MSB until the two number are the same. In certain embodiments, for the number of a bit of a time domain resource assignment field in DCI, if a number considered by a UE or terminal is less than the number in DCI, then the UE or terminal may have the least significant bits of the number considered by the UE or terminal to be equal to the number in DCI.

As a third exemplary operation, the gNB (e.g., the BS) may select a set of parameters from the selected parameter set. As a fourth exemplary operation, the gNB (e.g., the BS) may send a downlink control signal to the UE or terminal, where the downlink control signal includes at least an index of the selected parameter set.

Various embodiments related to the second exemplary operation are discussed in further detail below. For example, with reference to the second exemplary operation, in certain embodiments the predefined information may be a parameter in an extend field of a time domain resource assignment mentioned before that includes a maximum 5 bits. If the field is 5 bits, an MSB of 1 may indicate that the selection of parameter set for a period time (e.g., slot from n+1 to n+k) is different from the selection of parameter set for the slot which receives current signaling (e.g., slot n). If the slot n is associated with the first kind of parameter set, then the slots from n+1 to n+k may be associated with the second parameter set. If the slot n is associated with the second parameter set, then the slots from n+1 to n+k may be associated with the first parameter set.

In certain embodiments, the UE or terminal may not get a number of bits of a time domain resource assignment field in DCI before decoding DCI. For example, this may occur when the number of bit of the time domain resource assignment field in DCI is not the same as the number considered by a UE or terminal (e.g., when a UE or terminal consider (e.g., expect to decode) 3 bits of a time domain resource assignment field in DCI while there are 4 bits of the time domain resource assignment field in DCI). In certain embodiments, for the number of bit of a time domain resource assignment field in DCI, if a number considered by the UE or terminal is greater than the number in DCI, the terminal prepends zero to a MSB until the two number are the same. In certain embodiments, for the number of bit of a time domain resource assignment field in DCI, if a number considered by a UE or terminal is less than the number in DCI, then the UE or terminal may use the least significant bits of the number considered by the UE or terminal to be equal to the number in DCI.

In certain embodiments, with reference to the second exemplary operation, the predefined information may be a signal sent from a BS to a UE. The signal may three thresholds Y1 and Y2 and Y3, where Y1 is greater than or equal to 0, Y2 is greater than or equal to 0, and Y3 is greater than or equal to 0. In certain embodiments, a parameter set which includes k0, k2, and an aperiodic CSI-RS offset may satisfy the following conditions: that k0 is greater than or equal to Y1 and the aperiodic CSI-RS offset is greater than and equal to Y2 and k2 is greater than or equal to Y3. If Y1 is greater than 0 and Y2 is greater than 0 and Y3 is greater than 0, then a second kind of parameter set may be selected (e.g., used). Otherwise, a first kind of parameter set may be selected (e.g., used).

Figure 5:
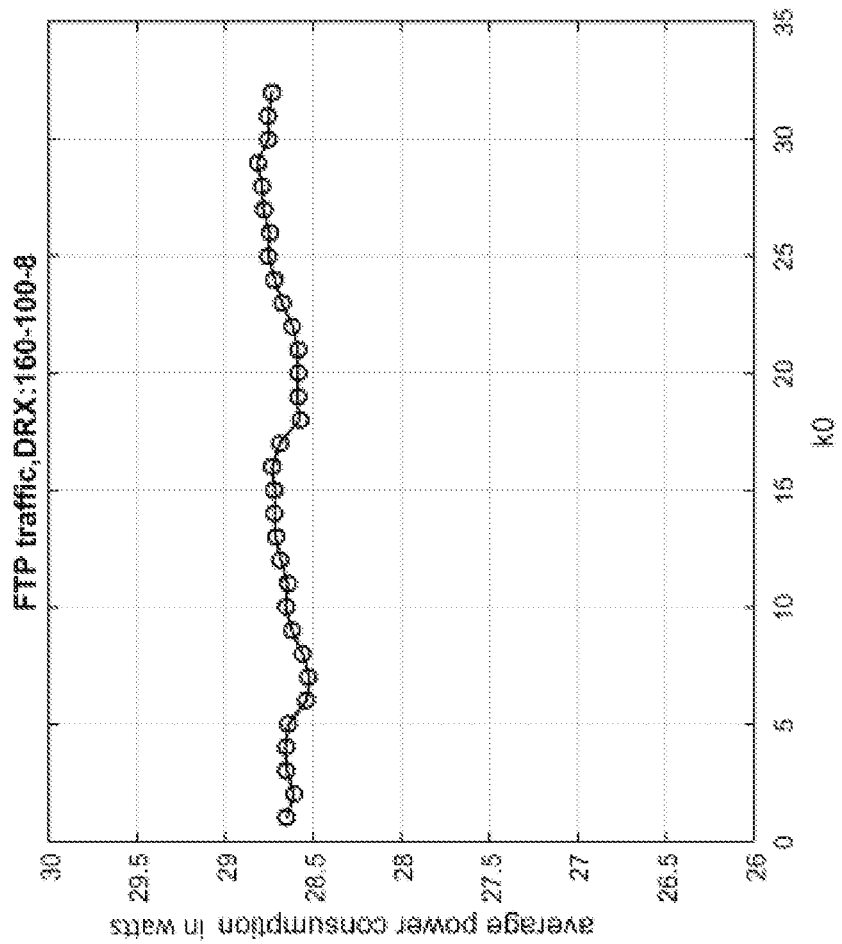
FIG. 5 illustrates simulation results of average power consumption of a user equipment in watts plotted over different values of k0, in accordance with some embodiments.

FIG. 5 illustrates simulation results of average power consumption of a user equipment in watts plotted over different values of k0, in accordance with some embodiments. FIG. 5 reflects a simulated file transfer protocol (FTP) model 3 (e.g., of a 0.5 megabyte packet size and a mean inter-arrival time 200 milliseconds). Also, in FIG. 5, a DRX configuration may be 160-100-8, which represent DRX cycle-inactivityTimer-ON duration values.

In certain embodiments, Y1 and Y2 and Y3 are set to be a small value. Accordingly, the value of k0 may have nearly no impact for average power consumption observed, as illustrated in FIG. 5.

In certain embodiments, with reference to the second exemplary operation, the predefined information may be a field in DCI which indicate the selection of a parameter set. The field may have one bit to indicate a selection of a parameter set for a period time. For example, a value of 1 may indicate the selection of a parameter set for a period of time (e.g., from slots n+1 to n+k) that is different from the selection of parameter set for the slot which is receiving a signal (e.g., slot n).

In certain embodiments, with reference to the second exemplary operation, an index value of PDSCH-TimeDomainResourceAllocationlist for downlink may be chosen to indicate that a selection of a parameter set for a period time (e.g., slot from n+1 to n+k) is different from the selection of a parameter set for the slot which is receiving a signal (e.g., slot n). If the index mentioned above is received by a UE, then the selection of a parameter set for a period time (e.g., a slot from n+1 to n+k) may be different from a selection of a parameter set for the slot which is receiving the signal (e.g., slot n).

Also, an index of PUSCH-TimeDomainResourceAllocationlist for uplink may be chosen to indicate that a selection of a parameter set for a period time (e.g., slot from n+1 to n+k) is different from the selection of a parameter set for the slot which is receiving a signal (e.g., slot n). If the index mentioned above is received by a UE, then the selection of a parameter set for a period time (e.g., a slot from n+1 to n+k) may be different from a selection of a parameter set for the slot which is receiving the signal (e.g., slot n).

In certain embodiments, with reference to the second exemplary operation, the predefined information is a specific SLIV value or k0 value or k2 value which may be used to indicate the selection of a parameter set for a period of time. For example, if the slot receives a DCI with the predefined specific parameter SLIV value or k0 value or k2 value, then the selection of a parameter set for a period of time is different from that of a slot which is receiving a signal (e.g., the parameter set is for a future slot).

In certain embodiments, with reference to the second exemplary operation, the predefined information may be a number value of 4 in a time domain resource assignment field in DCI. Also, a PUSCH-TimeDomainResourceAllocationlist or PDSCH-TimeDomainResource Allocationlist configured by RRC may have 8 elements. Then, the MSB of the time domain resource assignment field in DCI may indicate the selection of a parameter set.

In certain embodiments, with reference to the second exemplary operation, the predefined information may be a running bwp-InactivityTimer timer when the active BWP is less than a threshold. If so, the second kind of parameter set may be selected. Otherwise the first kind of parameter set may be selected.

In certain embodiments, with reference to the second exemplary operation, the predefined information may be a long DRX cycle when a drx-onDurationTimer or drx-InactivityTimer is running. If so, the second kind of parameter set may be selected.

In certain embodiments, with reference to the second exemplary operation, the predefined information may be the short DRX cycle when a drx-ShortCycleTimer and drx-onDurationTimer is running. If so, the second kind of parameter set may be selected.

In certain embodiments, with reference to the second exemplary operation, the predefined information may be the DRX cycle when a drx-InactivityTimer is running and there is no data scheduled in the last Y (e.g., where Y is a threshold) slot. If so, the second kind of parameter set may be selected.

In certain embodiments, with reference to the second exemplary operation, if the scrambling method configured for a PDCCH matches information in MCS-C-RNTI and/or the higher layer parameter mcs-Table given by a PDSCH-Config is set to qam64LowSE (e.g., the MCS table in PDSCH configuration is qam64LowSE), then the first kind of parameter set may be selected.

In certain embodiments, with reference to the second exemplary operation, if the scrambling method configured for PDCCH matches information in MCS-C-RNTI and/or mcs-Table in a PUSCH-Config is set to qam64LowSE (e.g., the MCS table in PUSCH configuration is qam64LowSE), then the first kind of parameter set may be selected.

In certain embodiments, with reference to the second exemplary operation, if the scrambling method configured for PDCCH matches information is not in MCS-C-RNTI and the higher layer parameter mcs-Table given by PDSCH-Config is not set to qam64LowSE and 5QI indicates that the required transmission delay is greater than a threshold, then the second kind of parameter set may be selected.

In certain embodiments, with reference to the second exemplary operation, if the scrambling method configured for PDCCH matches information is not in MCS-C-RNTI and the higher layer parameter mes-Table given by PDSCH-Config is not set to qam64LowSE and there is no data scheduled in the last Y (e.g., where Y is a threshold) slot, then the second kind of parameter set may be selected.

In certain embodiments, with reference to the second exemplary operation, if the scrambling method configured for PDCCH matches information in MCS-C-RNTI and/or mcs-Table in SPS-Config is set to qam64LowSE (e.g., the MCS table in PUSCH configuration is qam64LowSE), then the first kind of parameter set may be selected.

In certain embodiments, with reference to the second exemplary operation, if the scrambling method configured for PDCCH matches information in MCS-C-RNTI and/or mcs-Table in ConfiguredGrantConfig is set to qam64LowSE (e.g., the MCS table in a PUSCH configuration is qam64LowSE), then the first kind of parameter set may be selected.

In certain embodiments, with reference to the second exemplary operation, predefined information may be a higher layer signal sent from a BS to a UE. For example this higher layer signal may be a RRC or MAC CE signal. In further embodiments, the higher layer signal may be predefined information that is BWP specific. For case of explanation, this signaling (e.g., the signaling performed by this higher layer signal) may be referred to as one of Method A or Method B. If part of Method A, the signaling may indicate a threshold value (or a minimum slot offset value) configured for slot offset, where only the slot offset larger than or equal to the threshold value can be used. The threshold values may include at least one of threshold values for k0, k1, k2, and an aperiodic CSI-RS offset. For example, the threshold values may be greater than or equal to zero and less than 5.

In further embodiments, if the threshold values are greater than zero, the first kind of parameter set may be disabled and the second kind of parameter set may be enabled for selection. Otherwise, the first kind of parameter set is enabled, and the second kind of parameter set is disabled for selection. In certain embodiments, the threshold values are set as the value of Nmin1, Nmin2, Nmin3, and/or Nmin4. In further embodiments, if the threshold value is not received from the signaling, then the first kind of parameter set may be selected.

If part of Method B, the signal may carry a parameter of one bit to indicate which kind of parameter set is enabled. For example, if a parameter value is 0, then the first kind of parameter set is enabled, and the second kind of parameter set is disabled. As another example, if a parameter value is 1, then the first kind of parameter set is disabled, and the second kind of parameter set is enabled. As yet another example, if the parameter value is not present, then the first kind of parameter set may be selected.

In certain embodiments, with reference to the first exemplary operation, the gNB (e.g., the BS) may select the first kind of parameter set or the second kind of parameter set based on the higher layer configuration signal and predefined information. In certain embodiments, the higher layer configuration signal may be a RRC or/MAC CE signal. The higher layer configuration signal may be BWP specific.

In further embodiments, the higher layer configuration signal may include a parameter which can indicate which kind of parameter set is enabled (e.g., selected). If the higher layer configuration signal is not present, select the first kind of parameter set. For ease of explanation, this signal (e.g., this higher layer signal) may be referred to in association with Method A or Method B or Method C. As part of Method A, when a parameter is represented as one bit, a value of 0 or 1 may indicate that a first kind of parameter set or a second kind of parameter set is enabled (e.g., selected).

Method B may reflect a situation where a parameter may be a threshold value (or the minimum slot offset value) configured for slot offset, where only the slot offset larger than or equal to the threshold value can be used. These threshold values may include at least one of the threshold values for k0, k1, k2, and an aperiodic CSI-RS offset. If the threshold values are greater than zero, the first kind of parameter set is disabled and the second kind of parameter set is enabled (e.g., selected). The threshold values may be set as the value of Nmin1, Nmin2, Nmin3, Nmin4. Otherwise, the first kind of parameter set is enabled (e.g., selected), and the second kind of parameter set is disabled for selection. In further embodiments, threshold values are greater than or equal to zero and less than 5.

Method C may reflect a situation where parameter is a choice from enable and disable, which indicates that the second kind of parameter set is enabled/disabled.

As noted above, in further embodiments, a gNB (e.g., a BS) may select a set of parameters from the selected parameter set. Also, the gNB may send a downlink control signal to a terminal (e.g., a UE), where the downlink control signal includes at least an index of a selected parameter set.

In certain embodiments, with reference to the second exemplary operation, the predefined information is associated with DCI and higher layer signaling. The DCI may include a field of a value of 1, which may indicate that the second kind of parameter set is enabled (e.g., selected). The higher layer signaling may be an RRC signal, which may indicate a threshold value Y for k0, where Y is one of the set {1, 2, 3 . . . 10} and Nmin1 is reconfigured to be equal to Y.

In certain embodiments, a high layer configuration signal may indicate a time period associated with the high layer configuration signal. This time period may be utilized to determine whether a slot offset information set is the first kind of slot offset information set or the second kind of slot offset information set.

In certain embodiments, the predefined information is a (related) parameter indicating a resource, and at least one of the following: a number of physical resource blocks in the frequency domain, bandwidth part index (BWP ID), control resource set index (CORESET ID), subcarrier spacing (SCS), carrier aggregation, frequency range type (FR type), rank indication value (RI), number of antenna ports (Port), and a precoding codebook index (PMI).

In certain embodiments, if the number of physical resource blocks in the frequency domain is larger than a threshold, the first kind of parameter set may be selected. Otherwise, the second kind of parameter set may be selected In further embodiments, if a bandwidth parts identifier (BWP ID) indicates a BWP larger than a threshold (e.g., 20 MHz), then the first kind of parameter set may be selected. Otherwise, the second kind of parameter set may be selected.

In further embodiments, if a frequency range type is type 2, then the first kind of parameter set may be selected. Otherwise, the second kind of parameter set may be selected.

In further embodiments, if subcarrier spacing is larger than a threshold (e.g., 120 kHz), then the first kind of parameter set may be selected. Otherwise, the second kind of parameter set may be selected.

In further embodiments, if carrier aggregation is activated, then the first kind of parameter set may be selected. Otherwise, the second kind of parameter set may be selected. In further embodiments, if a number of antenna ports is greater than 2, then the first kind of parameter set may be selected. Otherwise, the second kind of parameter set may be selected.

In further embodiments, the predefined information is a parameter of control information and at least one of the following: a search space, a user equipment identity, and a parameter in a field of downlink control information (DCI).

In further embodiments, the predefined information refers to a (correlation) parameter of a reference signal and at least one of the following: a channel state information reference signal (CSI-RS), a demodulation reference signal (DMRS), a hybrid automatic repeat request acknowledgement signal (HARQ-ACK), a tracking reference signal (TRS), and a sounding reference signal (SRS).

In certain embodiments, a first kind of parameter set may be selected when a UE receives a tracking reference signal (TRS).

In further embodiments, a first kind of parameter set may be selected when a UE reports a hybrid automatic repeat request non-acknowledgement signal (HARQ-NACK).

In further embodiments, a second kind of parameter set may be selected when a CSI-RS indicates a high signal to interference plus noise ratio (SINR), select the second kind of parameter set. Otherwise, the first kind of parameter set may be selected.

In further embodiments, the predefined information may refers to indication signaling and at least one of the following: radio resource control layer control signaling or layer 3 signaling, intermediate access control layer control information or layer 2 signaling, downlink control information or layer 1 signaling. In further embodiments, such signaling may carry a parameter to indicate which kind of parameter set to select or a threshold value.

In further embodiment, the predefined information may be group specific, where the terminals in the group refers to multiple base stations according to parameters related to a terminal (e.g., a UE). The terminal (e.g., the UE) may be divided into a group, and the parameters related to the terminal (e.g., the UE) include one of the following: terminal or UE identification information (UE ID), a cell radio network temporary identification number (C-RNTI), and a priority of a service type.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless device, comprising:
  receiving slot offset indication information from a wireless communication node, wherein the slot offset indication information classifies a slot offset information set for scheduling an uplink transmission or a downlink reception as either a first kind set or a second kind set;
  determining, based on the slot offset indication information, whether the slot offset information set is the first kind set or the second kind set, wherein:
    the slot offset information set being determined as the first kind set indicates that slot offsets in the first kind set are greater than or equal to 0 and less than or equal to Nmax, wherein Nmax is a positive integer greater than 10, and
    the slot offset information set being determined as the second kind set indicates that slot offsets in the second kind set are greater than or equal to a minimum threshold value and less than or equal to Nmax, wherein the minimum threshold value is greater than 0 and is indicated to the wireless device via a first radio resource control (RRC) message; and performing the uplink transmission or the downlink reception according to the first kind set or the second kind set as determined based on the slot offset indication information.

2. The method of claim 1, further comprising:
receiving at least one slot offset information value associated with the slot offset information set via downlink control information from the wireless communication node, wherein the at least one slot offset information value characterizes the offset as a number of time slots.

3. The method of claim 1, wherein receiving the slot offset indication information comprises receiving the slot offset indication information via a Downlink Control Information (DCI) message from the wireless communication node.

4. The method of claim 1, wherein, before receiving the slot offset indication information from the wireless communication node, the method further comprises:
receiving, from the wireless communication node, a second RRC message for configuring the slot offset information set.

5. The method of claim 1, wherein each slot offset in the slot offset information set belongs to one of:
a first offset between a downlink control information time slot and a physical downlink shared channel time slot;
a second offset between the downlink control information time slot and a physical uplink shared channel time slot; or
a third offset between the downlink control information time slot and its associated aperiodic non zero power channel state information reference signal (NZP CSI-RS) resources set time slot.

6. The method of claim 1, further comprising:
transmitting, to the wireless communication node, UE assistance information comprising a desired value for the minimum threshold value.

7. The method of claim 1, wherein the minimum threshold value is associated with at least one of:
an identifier for a bandwidth part (BWP-id);
a bandwidth part transition latency;
a physical downlink shared channel decoding time;
a physical uplink shared channel preparation time;
a quasi-co-location type;
a sub carrier spacing; or
a capability of the wireless device.

8. A device comprising a memory for storing computer instructions and a processor in communication with the memory, wherein, when the processor executes the computer instructions, the processor is configured to cause the device to:
receive slot offset indication information from a wireless communication node, wherein the slot offset indication information classifies a slot offset information set for scheduling an uplink transmission or a downlink reception as either a first kind set or a second kind set;
determine, based on the slot offset indication information, whether the slot offset information set is the first kind set or the second kind set, wherein:
the slot offset information set being determined as the first kind set indicates that slot offsets in the first kind set are greater than or equal to 0 and less than or equal to Nmax, wherein Nmax is a positive integer greater than 10, and
the slot offset information set being determined as the second kind set indicates that slot offsets in the second kind set are greater than or equal to a minimum threshold value and less than or equal to Nmax, wherein the minimum threshold value is greater than 0 and is indicated to the device via a first radio resource control (RRC) message; and perform the uplink transmission or the downlink reception according to the first kind set or the second kind set as determined based on the slot offset indication information.

9. The device of claim 8, wherein, when the processor executes the computer instructions, the processor is configured to further cause the device to:
receive at least one slot offset information value associated with the slot offset information set via downlink control information from the wireless communication node, wherein the at least one slot offset information value characterizes the offset as a number of time slots.

10. The device of claim 8, wherein, when the processor is configured to cause the device to receive the slot offset indication information, he processor is configured to cause the device to receive the slot offset indication information via a Downlink Control Information (DCI) message from the wireless communication node.

11. The device of claim 8, wherein, before the processor is configured to cause the device to receive the slot offset indication information from the wireless communication node, the processor is configured to further cause the device to:
receive, from the wireless communication node, a second RRC message for configuring the slot offset information set.

12. The device of claim 8, wherein each slot offset in the slot offset information set belongs to one of:
a first offset between a downlink control information time slot and a physical downlink shared channel time slot;
a second offset between the downlink control information time slot and a physical uplink shared channel time slot; or
a third offset between the downlink control information time slot and its associated aperiodic non zero power channel state information reference signal (NZP CSI-RS) resources set time slot.

13. The device of claim 8, wherein, when the processor executes the computer instructions, the processor is configured to further cause the device to:
transmit, to the wireless communication node, UE assistance information comprising a desired value for the minimum threshold value.

14. The device of claim 8, wherein the minimum threshold value is associated with at least one of:
an identifier for a bandwidth part (BWP-id);
a bandwidth part transition latency;
a physical downlink shared channel decoding time;
a physical uplink shared channel preparation time;
a quasi-co-location type;
a sub carrier spacing; or
a capability of the device.

15. A non-transitory storage medium for storing computer readable instructions, the computer readable instructions, when executed by a processor in a wireless device, causing the processor to:
receive slot offset indication information from a wireless communication node, wherein the slot offset indication information classifies a slot offset information set for scheduling an uplink transmission or a downlink reception as either a first kind set or a second kind set;

determine, based on the slot offset indication information, whether the slot offset information set is the first kind set or the second kind set, wherein:
 the slot offset information set being determined as the first kind set indicates that slot offsets in the first kind set are greater than or equal to 0 and less than or equal to Nmax, wherein Nmax is a positive integer greater than 10, and
 the slot offset information set being determined as the second kind set indicates that slot offsets in the second kind set are greater than or equal to a minimum threshold value and less than or equal to Nmax, wherein the minimum threshold value is greater than 0 and is indicated to the wireless device via a first radio resource control (RRC) message; and
perform the uplink transmission or the downlink reception according to the first kind set or the second kind set as determined based on the slot offset indication information.

16. The non-transitory storage medium of claim 15, wherein the computer readable instructions further cause the processor to:
receive at least one slot offset information value associated with the slot offset information set via downlink control information from the wireless communication node, wherein the at least one slot offset information value characterizes the offset as a number of time slots.

17. The non-transitory storage medium of claim 15, wherein, when the computer readable instructions cause the processor to receive the slot offset indication information, the computer readable instructions cause the processor to receive the slot offset indication information via a Downlink Control Information (DCI) message from the wireless communication node.

18. The non-transitory storage medium of claim 15, wherein, before the computer readable instructions cause the processor to to receive the slot offset indication information from the wireless communication node, the computer readable instructions further cause the processor to:
receive, from the wireless communication node, a second RRC message for configuring the slot offset information set.

19. The non-transitory storage medium of claim 15, wherein each slot offset in the slot offset information set belongs to one of:
 a first offset between a downlink control information time slot and a physical downlink shared channel time slot;
 a second offset between the downlink control information time slot and a physical uplink shared channel time slot; or
 a third offset between the downlink control information time slot and its associated aperiodic non zero power channel state information reference signal (NZP CSI-RS) resources set time slot.

20. The non-transitory storage medium of claim 15, wherein the computer readable instructions further cause the processor to:
transmit, to the wireless communication node, UE assistance information comprising a desired value for the minimum threshold value.

* * * * *